G. A. C. MONROE.
COLLAPSIBLE BED.
APPLICATION FILED JULY 28, 1920.

1,394,331.

Patented Oct. 18, 1921.
2 SHEETS—SHEET 1.

GEORGE A. C. MONROE,
By Geo. P. Kimmel
Attorney

G. A. C. MONROE.
COLLAPSIBLE BED.
APPLICATION FILED JULY 28, 1920.
1,394,331.
Patented Oct. 18, 1921.
2 SHEETS—SHEET 2.
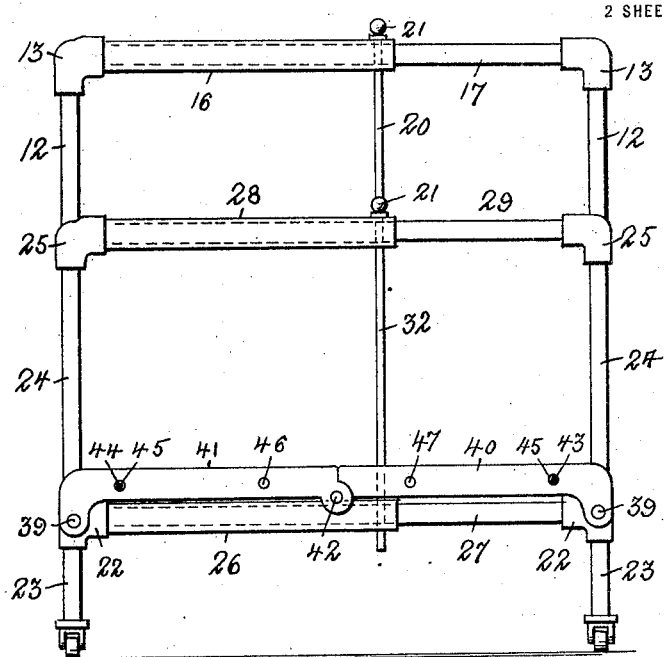
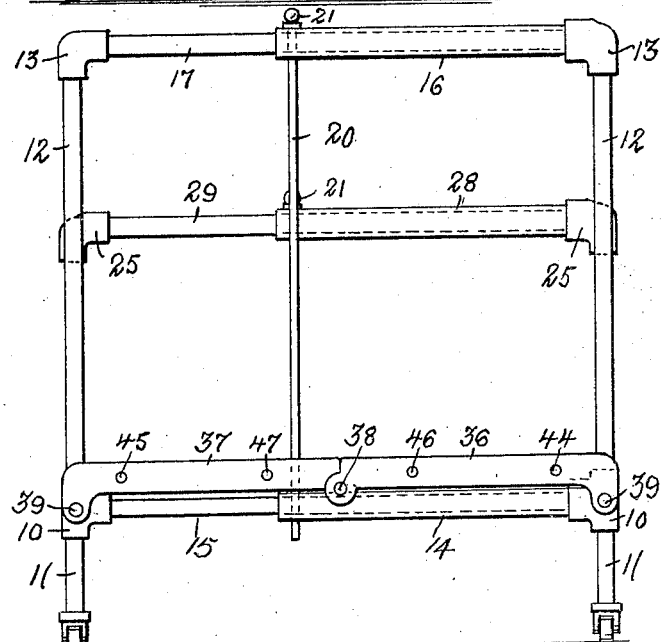
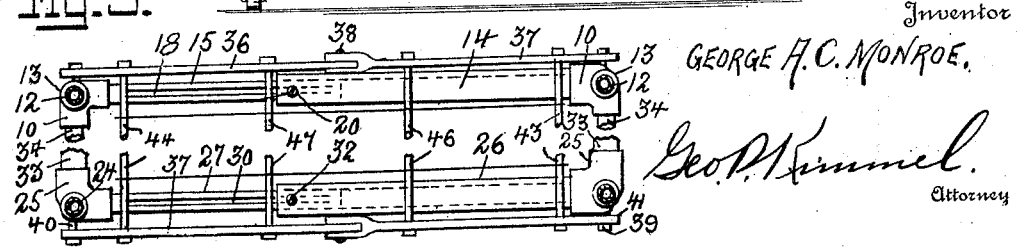
Inventor
GEORGE A. C. MONROE.
Geo. P. Kimmel.
Attorney

UNITED STATES PATENT OFFICE.

GEORGE A. C. MONROE, OF GENEVA, ILLINOIS.

COLLAPSIBLE BED.

1,394,331.   Specification of Letters Patent.   Patented Oct. 18, 1921.

Application filed July 28, 1920. Serial No. 399,454.

*To all whom it may concern:*

Be it known that I, GEORGE A. C. MONROE, a citizen of the United States, residing at Geneva, in the county of Kane and State of Illinois, have invented certain new and useful Improvements in a Collapsible Bed, of which the following is a specification.

This invention relates to folding or collapsible bed frames, and has for one of its objects to improve and simplify the construction of devices of this character.

Another object of this invention is to provide a device of this character which is capable of adjustment, to increase or decrease the width and length, as required.

Another object of this invention is to provide a device of this character including a foldable spring mattress.

With these and other objects in view, the invention consists in certain novel features of construction as hereinafter shown and described and then specifically pointed out in the claims, and in the drawings illustrative of the preferred embodiment of the invention.

Fig. 3 is an elevation from the foot end.

Fig. 4 is an end elevation from the head end.

Fig. 5 is a detail plan view of the head and foot portions with the corner posts in section on the line 5—5 of Fig. 1.

Figure 1:
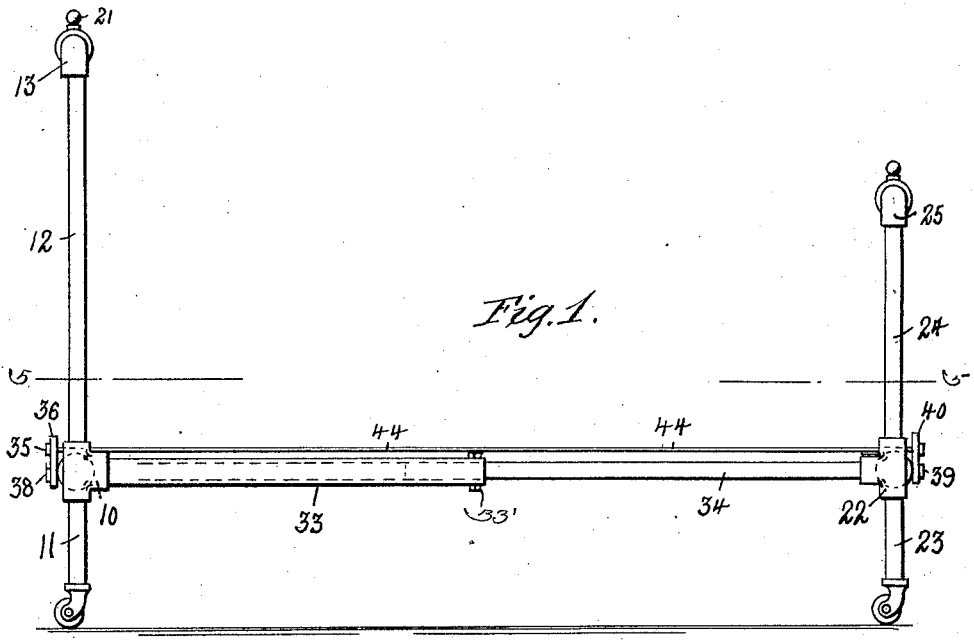
Figure 1 is a side elevation.
Figure 2:
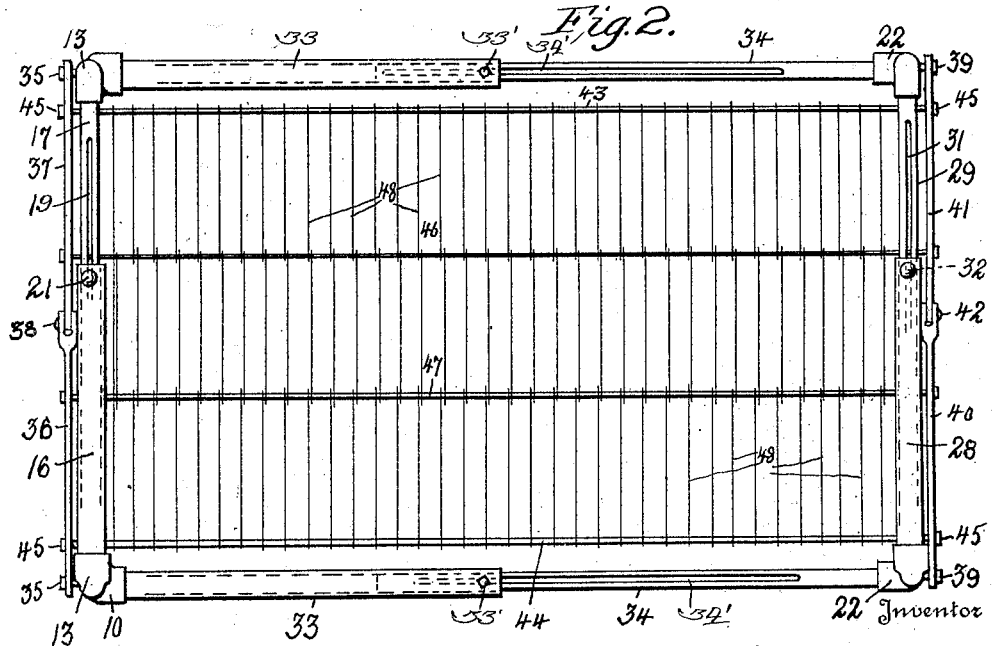
Fig. 2 is a plan view.

The improved bedstead or frame is constructed very largely of pipe fittings, with the side and end rails telescoping, and the mattress support associated with the end members and foldable or collapsible therewith.

The "head" portion of the bed frame comprises four way couplings 10 in the lower ends of which sections of piping 11 are threaded and constitute the legs of the head portion.

Threaded into the upper ends of the coupling members 10 are sections of piping 12 having elbows 13 threaded upon their upper ends.

Threaded into one of the lateral portions of one of the coupling members 10 is a section of the piping 14, and threaded into one of the lateral portions of the other coupling member 10 is a section of smaller piping 15 which telescopically engages the section 14.

Threaded into one of the elbows 13 is a section of piping 16, and threaded into the other elbow 13 is a section of smaller piping 17 which telescopically engages the piping section 16.

The piping section 15 is provided with longitudinally directed slots 18 while the piping section 17 is provided with similar slots 19.

The piping sections 14 and 16 are provided respectively with apertures through which and the slots 18 and 19 a guide rod 20 is passed, the rod having an enlargement or knob 21, to limit the downward movement.

The rods and slots thus coöperate to prevent the parts 14 and 16 and 15 and 17 from becoming separated when drawn outwardly, while at the same time permitting the adjustment longitudinally of the telescoping members.

The foot portion of the improved bed frame, comprises four way couplings 22 in the lower ends of which sections of piping 23 are threaded to form the legs of the foot portion.

Threaded into the upper ends of the coupling members 22 are sections of piping 24 having elbows 25 threaded upon their upper ends.

Threaded into one of the lateral portions of one of the coupling members 22 is a section of piping 26, and threaded into one of the lateral portions of the other coupling member 22 is a section of smaller piping 27 which telescopically engages in the piping section 26.

Threaded into one of the elbows 25 is a section of piping 28, and threaded into the other elbow 25 is a section of smaller piping 29 which telescopically engages the piping section 28.

The piping section 27 is provided with longitudinally directed slots 30, while the piping section 29 is provided with like slots 31.

The piping sections 26 and 28 are provided respectively with apertures through which and the slots 30 and 31 a guide rod 32 is passed, the rod having an enlargement or knob at the upper end to limit the downward movement.

The rods and slots thus coöperate to prevent the parts 26 and 28 and 27 and 29 from becoming separated when drawn outwardly, while at the same time permitting the adjustment longitudinally of the telescoping members.

Threaded respectively into the remaining lateral portions of the couplings 10 are piping sections 33, and threaded respectively into the remaining lateral portions of the couplings 22 are sections of smaller piping 34 which telescopically engage the piping sections 33. The sections 34 are provided respectively with longitudinal slots 34' and the sections 33 are provided with pins 33' passing through the slots 34'. By this means the members 33 and 34 may be adjusted longitudinally but can not be disconnected without removing the pins 33'.

Pivoted at 35 respectively to the coupling members 10 are links 36 and 37 the latter pivotally united at their confronting ends as shown at 38.

Pivoted at 39 respectively to the couplings 22 are links 40 and 41, the latter pivotally united at their confronting ends as shown at 42.

The links 36—37 and 40—41 are apertured to receive longitudinally directed rods 43 and 44, the latter threaded to receive holding nuts 45 by which the rods are connected to the links.

The links are likewise apertured to receive other rods 46 and 47 spaced from the rods 43 and 44.

The rods serve as supports for woven wire elements 48 which coact with the rods to form an effectual woven wire mattress which is foldable with rods and links.

The links, rods and woven wire elements thus coact with the laterally adjustable head and foot portions to produce a complete collapsible bed frame and metal mattress.

The joints of the link devices, it will be noted are constructed to "break" upwardly only hence the weight of the person occupying the bed will not sag the bed below a level position, while at the same time the spring mattress element will fold upwardly in inverted V shape when the frame is collapsed.

Preferably the members 12 at the head of the bed frame are longer than the corresponding members 24 at the foot, and the rod 20 at the head is longer than the corresponding rod 32 at the foot.

What I claim is:

1. A collapsible bed frame comprising head and foot portions formed with telescoping members, side rails connecting the head and foot portions, links hingedly united at their confronting ends and pivotally united at their outer ends to the head and foot portions, rods attached through said links, and flexible wire elements connecting said rods.

2. A collapsible bed frame comprising head and foot portions formed with telescoping members in vertical alinement, one of said members being logitudinally slotted, side rails connecting the head and foot portions, links hingedly united at their confronting ends and pivotally united at their outer ends to the head and foot portions and disposed in longitudinal alinement when in operative position, vertical rods extending through the telescoping members of the head and foot portions, rods connected to the links and extending longitudinally of the bed frame, and a plurality of flexible members connected to the rods and extending transversely of the bed frame, said flexible members foldable upwardly when the bed frame is collapsed.

In testimony whereof, I affix my signature hereto.

GEORGE A. C. MONROE.